US010496192B2

United States Patent
Zhang et al.

(10) Patent No.: US 10,496,192 B2
(45) Date of Patent: Dec. 3, 2019

(54) COMPUTER STYLUS HAVING INTEGRATED ANTENNA AND SENSOR STRUCTURES

(71) Applicant: Apple Inc., Cupertino, CA (US)

(72) Inventors: Lu Zhang, Shanghai (CN); Mattia Pascolini, San Francisco, CA (US); Yi Jiang, Cupertino, CA (US); Harish Rajagopalan, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/906,937

(22) Filed: Feb. 27, 2018

(65) Prior Publication Data

US 2019/0265808 A1  Aug. 29, 2019

(51) Int. Cl.
| | |
|---|---|
| *G06F 3/0354* | (2013.01) |
| *G06F 3/044* | (2006.01) |
| *G06F 3/046* | (2006.01) |
| *H01Q 1/44* | (2006.01) |

(52) U.S. Cl.
CPC .......... *G06F 3/03545* (2013.01); *G06F 3/044* (2013.01); *G06F 3/046* (2013.01); *H01Q 1/44* (2013.01)

(58) Field of Classification Search
CPC ...... G06F 3/03545; G06F 3/044; G06F 3/046; H01Q 1/44
See application file for complete search history.

(56) References Cited

U.S. PATENT DOCUMENTS

| | | | |
|---|---|---|---|
| 5,475,401 A | 12/1995 | Verrier et al. | |
| 8,432,322 B2 | 4/2013 | Amm et al. | |
| 8,577,289 B2 | 11/2013 | Schlub et al. | |
| 9,633,247 B2 | 4/2017 | Pope et al. | |
| 9,766,727 B2 | 9/2017 | Jiang et al. | |
| 9,965,052 B2 | 5/2018 | Coutts et al. | |
| 2014/0255899 A1 | 9/2014 | Poullain | |
| 2015/0116291 A1 | 4/2015 | Leung et al. | |
| 2015/0303979 A1* | 10/2015 | Shin .................. | H04B 1/74 455/78 |
| 2015/0363013 A1* | 12/2015 | Coutts .............. | G06F 3/03545 345/179 |
| 2017/0010697 A1* | 1/2017 | Jiang ................ | G06F 3/03545 |

(Continued)

FOREIGN PATENT DOCUMENTS

JP  2006019775  1/2006

*Primary Examiner* — Premal R Patel
(74) *Attorney, Agent, or Firm* — Treyz Law Group, P.C.; Michael H. Lyons

(57) ABSTRACT

A computer stylus may be provided that includes an elongated body with a tip and an opposing end coupled together by a shaft that includes a metal tube. The stylus may include a substrate at the end of the elongated body and conductive traces on the substrate. The traces may form a sensor electrode for a sensor and an antenna resonating element for an antenna in the stylus. The sensor may include an electrode that gathers sensor signals. Control circuitry may wirelessly transmit the sensor signals to external equipment using the antenna. The sensor electrode may be coupled to the metal tube by a filter. The filter may form an open circuit at radio-frequencies and a short circuit at the frequency of the sensor signals. The filter may mitigate deterioration in wireless performance of the antenna associated with the presence of the sensor.

20 Claims, 13 Drawing Sheets

(56) References Cited

U.S. PATENT DOCUMENTS

2017/0040670 A1\* 2/2017 Chen .................. H01Q 5/22
2018/0052531 A1 2/2018 Peretz et al.
2018/0052534 A1 2/2018 Ron et al.
2018/0267636 A1\* 9/2018 Chiu .................. G06F 1/1643

\* cited by examiner

COMPUTER STYLUS HAVING INTEGRATED ANTENNA AND SENSOR STRUCTURES

BACKGROUND

This relates generally to wireless communications circuitry and, more particularly, to wireless communications circuitry for elongated wireless devices such as computer styluses.

It can be challenging to form wireless circuitry for electronic equipment. For example, it can be difficult to incorporate wireless components such as antennas into compact portable devices such as tablet computer styluses. If care is not taken, the presence of conductive structures such as conductive structures in a sensor for the electronic device will adversely affect antenna performance. Poor antenna performance can lead to the use of increased transceiver power and reduced battery life. Poor antenna performance can also degrade wireless functionality.

It would therefore be desirable to be able to provide improved wireless circuitry for wireless devices such as computer styluses.

SUMMARY

A computer stylus may be provided that supplies input to an electronic device such as a tablet computer. The stylus may have an elongated body with a tip and an opposing end coupled together by a shaft. The shaft may include a metal tube.

The computer stylus may include a dielectric substrate at the end of the elongated body and conductive traces or other conductive structures on the dielectric substrate. The conductive traces may form part of a sensor and part of an antenna for the computer stylus. For example, the conductive traces may be used to form a sensor electrode for the sensor and an antenna resonating element for the antenna.

The sensor may be a touch sensor, proximity sensor, or force sensor, as examples. The sensor may include a sensor electrode that gathers sensor signals at a relatively low frequency. The sensor may convey the sensor signals to control circuitry in the shaft over a sensor data path. The control circuitry may use the antenna to wirelessly transmit the sensor signals to the tablet computer over a wireless link. The sensor data path may include a conductive leg on the substrate that extends from the sensor electrode towards the metal tube. The conductive leg may be coupled to the metal tube by a filter. The filter may include a choke inductor that forms an open circuit at radio-frequencies and that forms a short circuit at the frequency of the sensor signals. The filter may serve to isolate the sensor from radio-frequency signals conveyed by the antenna and may mitigate deterioration in the wireless performance of the antenna associated with the presence of the sensor.

Additional conductive legs and filters may be used to couple the sensor electrode to the metal tube. The sensor electrode may be shorted to the antenna resonating element arm to extend the radiating length of the antenna to include portions of the sensor electrode. In another suitable arrangement, the sensor electrode may be formed on a flexible printed circuit that is wrapped around the dielectric substrate. The sensor electrode may include a portion that overlaps the antenna resonating element arm. The flexible printed circuit may have an end that is interposed between the portion of the sensor electrode and the antenna resonating element arm. If desired, the portion of the sensor electrode may be capacitively coupled to the antenna resonating element arm at radio-frequencies so that the portion of the sensor electrode forms a part of the antenna. The sensor and the antenna may both be integrated within the end of the stylus without sacrificing sensor data accuracy or wireless antenna performance.

DETAILED DESCRIPTION

Figure 1:
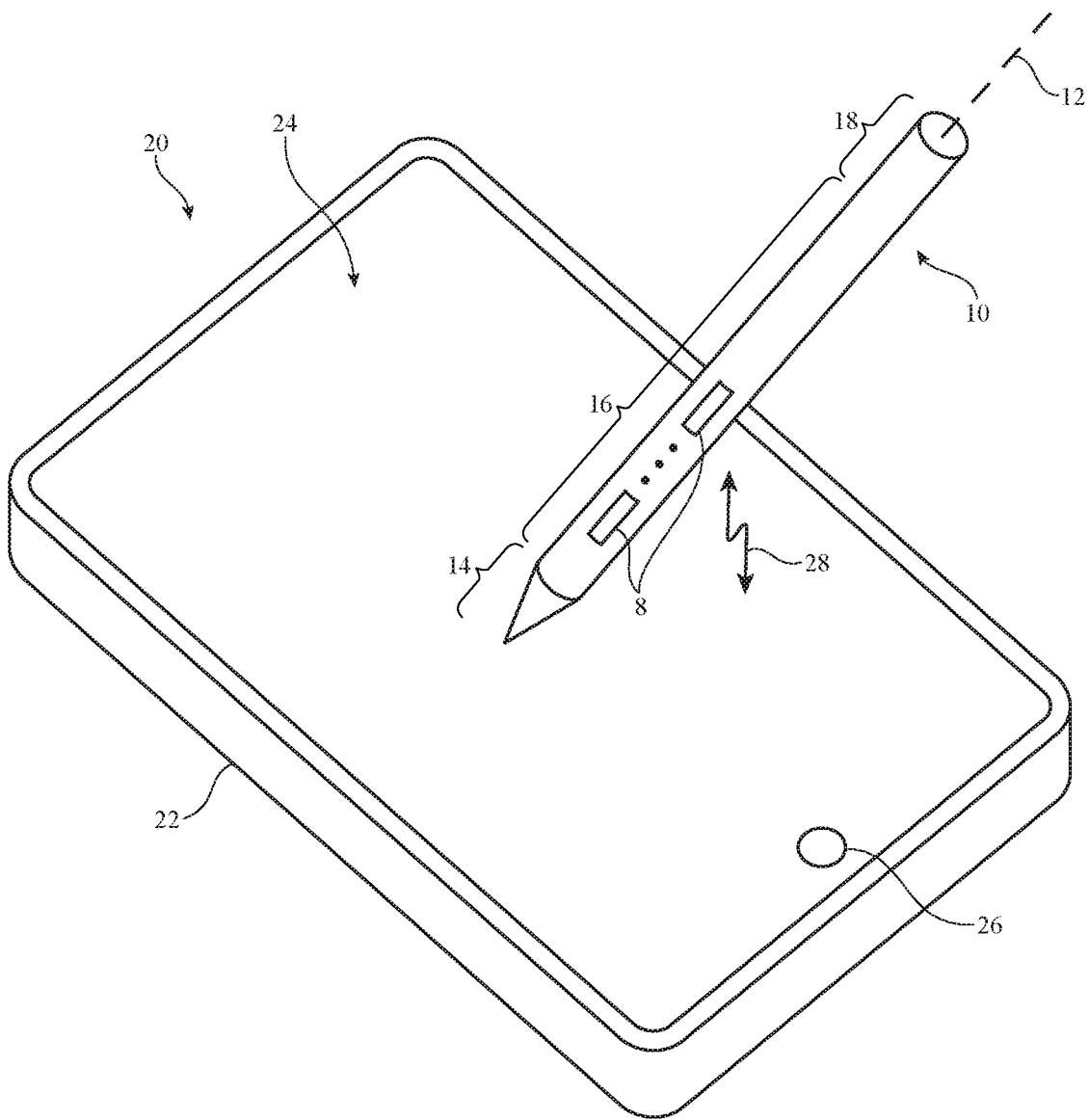
FIG. 1 is a perspective view of an illustrative computer and associated computer stylus in accordance with an embodiment.

A system that includes electronic equipment that communicates wirelessly is shown in FIG. 1. The equipment of FIG. 1 includes electronic device 10 and electronic device 20. Electronic equipment such as devices 10 and 20 may, in general, be computing devices such as laptop computers, computer monitors containing embedded computers, tablet computers, cellular telephones, media players, or other handheld or portable electronic devices, smaller devices such as wrist-watch devices, pendant devices, headphone or earpiece devices, devices embedded in eyeglasses or other equipment worn on a user's head, or other wearable or miniature devices, televisions, computer displays that do not contain embedded computers, gaming devices, navigation devices, embedded systems such as a systems in which electronic equipment is mounted in kiosks or automobiles, computer accessories such as touch pads, computer mice, computer styluses, or other electronic accessories, equipment that implements the functionality of two or more of these devices, or other electronic equipment. In the illustrative configuration of FIG. 1, which is sometimes described herein as an example, device 20 is a tablet computer or other device with a touch screen and device 10 is a computer stylus. When a drawing program or other software is running on tablet computer 20, a user can use stylus 10 to draw on tablet computer 20 and to provide other input to tablet computer 20.

Tablet computer 20 may include a housing such as housing 22 in which display 24 is mounted. Input-output devices such as button 26 may be used to supply input to tablet computer 20. Button 26 may be omitted if desired. Display 24 may be a capacitive touch screen display or a display that includes other types of touch sensor technology. The touch sensor of display 24 may be configured to receive input from stylus 10.

Stylus 10 may have a cylindrical shape or other elongated body that extends along longitudinal axis 12. The body of stylus 10 may be formed from metal and/or plastic tubes and other elongated structures. Stylus 10 and tablet computer 20 may contain wireless circuitry for supporting wireless communications via wireless communications link 28. As an example, stylus 10 may supply wireless input to tablet computer 20 via link 28 (e.g., information on settings in a drawing program or other software running on tablet computer 20, input to select a desired on-screen option, input to supply tablet computer 20 with a touch gesture such as a stylus flick, input to draw a line or other object on display 24, input to move or otherwise manipulate images displayed on display 24, etc.).

Stylus 10 may have a tip such as tip 14. Tip 14 may contain a conductive elastomeric member that is detected by the capacitive touch sensor of display 24. If desired, tip 14 may contain active electronics (e.g., circuitry that transmits signals that are capacitively coupled into the touch sensor of display 24 and that are detected as touch input on the touch sensor).

Shaft portion 16 of stylus 10 may couple tip 14 of stylus 10 to opposing end 18 of stylus 10. End 18 may contain a conductive elastomeric member, active electronics (e.g., circuitry that transmits signals that are capacitively coupled into the touch sensor of display 24 and that are detected as touch input on the touch sensor), buttons, sensor components such as a touch sensor, proximity sensor, or force sensor, or other input-output components.

Sensor components at end 18 of stylus 10 may, for example, generate touch or proximity sensor data indicative of whether or not end 18 of stylus 10 is being pressed against display 24 of tablet computer 20, force sensor data indicative of how hard end 18 of stylus 10 is being pressed against display 24 of tablet computer 20, etc. Wireless circuitry in stylus 10 may convey this sensor data to tablet computer 20 over link 28. Tablet computer 20 may change settings in a drawing program or may perform other operations based on the sensor data received from stylus 10. As one example, tablet computer 20 may use the received sensor data to activate an eraser function associated with a drawing program running on tablet computer 20, or may perform any other desired operations.

If desired, a force sensor may additionally or alternatively be incorporated into tip 14 of stylus 10. A force sensor in tip 14 may be used to measure how forcefully a user is pressing tip 14 of stylus 10 against the outer surface of display 24. Force data may then be wirelessly transmitted from stylus 10 to tablet computer 20 so that the thickness of a line that is being drawn on display 24 can be adjusted accordingly or so that tablet computer 20 may take other suitable action.

If desired, stylus 10 may be provided with a clip to help attach stylus 10 to a user's shirt pocket or other object, may be provided with a magnet to help attach stylus 10 to a magnetic attachment point in tablet computer 20 or other structure, or may be provided with other structures that help a user attach stylus 10 to external objects. Components such as components 8 may be formed on stylus 10 (e.g., on shaft 16 or elsewhere). Components 8 may include buttons, touch sensors, and other components for gathering input, light-emitting diodes or other components for producing output, etc. Components 8 may, for example, include input-output components such as a data port connector that receives a cable or other wire-based connectors (e.g., a connector that supplies power signals for charging a battery in stylus 10 and/or that supplies digital data), conductive structures that receive wireless power for charging the battery in stylus 10 and/or that receive other wireless signals (e.g., near-field signals), or any other desired components.

Stylus 10 may include a metal tube or other conductive components in shaft 16. The metal tube or other structures in stylus 10 may serve as an antenna ground for an antenna. The metal tube may also be used to ground components for sensors located at end 18 of stylus 10. An antenna resonating element for the antenna may be formed from metal traces on a printed circuit or other dielectric support structure and/or from other conductive structures. As an example, an antenna resonating element may be at end 18 of stylus 10.

Figure 2:
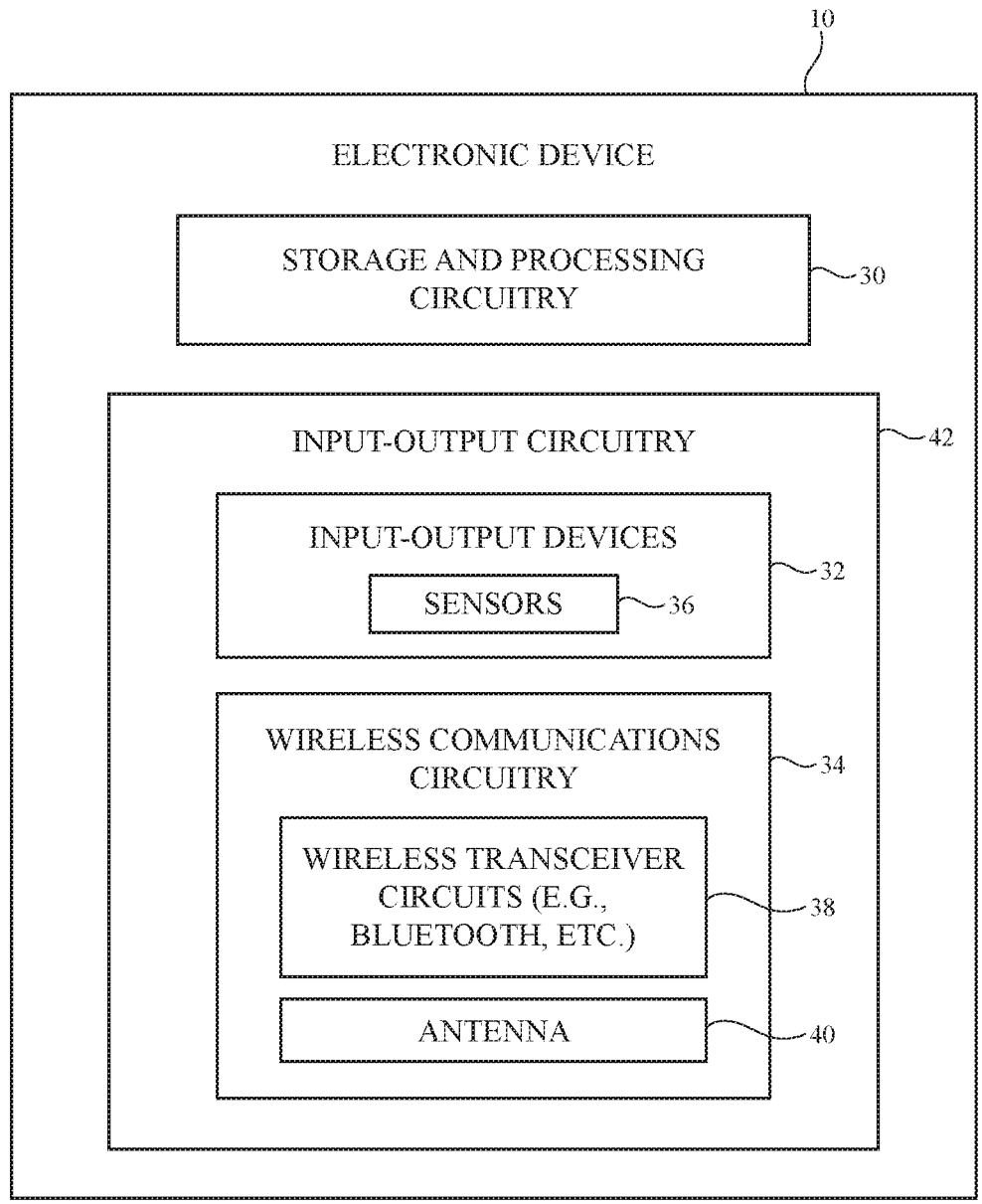
FIG. 2 is a schematic diagram of an illustrative stylus with wireless communications circuitry in accordance with an embodiment.

A schematic diagram showing illustrative components that may be used in stylus 10 is shown in FIG. 2. As shown in FIG. 2, stylus 10 may include control circuitry such as storage and processing circuitry 30. Storage and processing circuitry 30 may include storage such as nonvolatile memory (e.g., flash memory or other electrically-programmable-read-only memory configured to form a solid state drive), volatile memory (e.g., static or dynamic random-access-memory), etc. Processing circuitry in storage and processing circuitry 30 may be used to control the operation of stylus 10. This processing circuitry may be based on one or more microprocessors, microcontrollers, digital signal processors, baseband processor integrated circuits, application specific integrated circuits, etc.

Storage and processing circuitry 30 may be used to run software on stylus 10. The software may process input from buttons, sensors, and other input components. The software may also be used to provide output to a user (e.g., using light-emitting-diodes or other output components such as components 8 of FIG. 1). To support interactions with external equipment such as tablet computer 20, storage and processing circuitry 30 and other circuitry in stylus 10 may be used in implementing communications protocols. Communications protocols that may be implemented in stylus 10 include protocols for short-range wireless communications links such as the Bluetooth® protocol or other wireless personal area network (WPAN) protocols. If desired, other types of wireless communications links may be supported (e.g., wireless local area network (WLAN) communications links, satellite navigation links, etc.). The use of Bluetooth communications is merely illustrative.

Stylus 10 may include input-output circuitry 42. Input-output circuitry 42 may include input-output devices 32. Input-output devices 32 may be used to allow data to be supplied to stylus 10 and to allow data to be provided from stylus 10 to external devices such as tablet computer 20 (FIG. 1). Input-output devices 32 may include user interface devices, data port devices, and other input-output components. For example, input-output devices 32 may include touch screens, displays without touch sensor capabilities, buttons, joysticks, scrolling wheels, touch pads, microphones, cameras, speakers, status indicators, light sources, audio jacks and other audio port components, digital data port devices, light sensors, accelerometers or other components that can detect motion and stylus orientation relative to the Earth, or other input-output components.

If desired, input-output devices 32 may include one or more sensors 36 such as capacitance sensors, proximity sensors (e.g., a capacitive proximity sensor and/or an infrared proximity sensor), magnetic sensors, and/or force sensors. Sensors 36 may be mounted at end 18 of stylus 10 (FIG. 1) and may gather corresponding sensor data. Sensors 36 may, for example, sense the presence of display 24 and/or how stylus 10 is being used to interact with display 24 when end 18 is pointed towards or contacting the surface of display 24. Sensors 36 may also gather sensor data indicative to how a user is holding or interacting with stylus 10 (e.g., touch sensor or proximity sensor data indicative of whether or not a user is touching end 18 of stylus 10, force sensor data indicative of how hard a user is pressing against end 18 of stylus 10 with their hand, etc.). This sensor data may be conveyed to tablet computer 20 over wireless link 28 (FIG. 1) for further processing if desired.

As shown in FIG. 2, input-output circuitry 42 may include wireless communications circuitry 34 for communicating wirelessly with external equipment. Wireless communications circuitry 34 may include radio-frequency transceiver circuitry formed from one or more integrated circuits, power amplifier circuitry, low-noise input amplifiers, passive radio-frequency components, one or more antennas 40, radio-frequency transmission line paths, and other circuitry for handling radio-frequency wireless signals.

Wireless communications circuitry 34 may include radio-frequency transceiver circuitry 38 for handling wireless communications in the 2.4 GHz Bluetooth® communications band or other suitable communications bands (e.g., WPAN communications bands, WLAN communications bands, etc.). Bluetooth signals or other wireless signals may be transmitted and/or received by transceiver circuitry 38 using one or more antennas such as antenna 40. Antennas in wireless communications circuitry 34 may be formed using any suitable antenna types. For example, antennas for stylus 10 may include antennas with resonating elements that are formed from loop antenna structures, patch antenna structures, inverted-F antenna structures, slot antenna structures, planar inverted-F antenna structures, helical antenna structures, ring antenna structures, monopole antenna structures, dipole antenna structures, hybrids of these designs, etc. If desired, one or more of the antennas in stylus 10 may be cavity-backed antennas.

Transmission line paths may be used to couple antenna 40 to transceiver circuitry 38. Transmission line paths in stylus 10 may include coaxial cable paths, microstrip transmission lines, stripline transmission lines, edge-coupled microstrip transmission lines, edge-coupled stripline transmission lines, transmission lines formed from combinations of transmission lines of these types, etc. Filter circuitry, switching circuitry, impedance matching circuitry, and other circuitry may be interposed within the transmission line paths, if desired.

Figure 3:
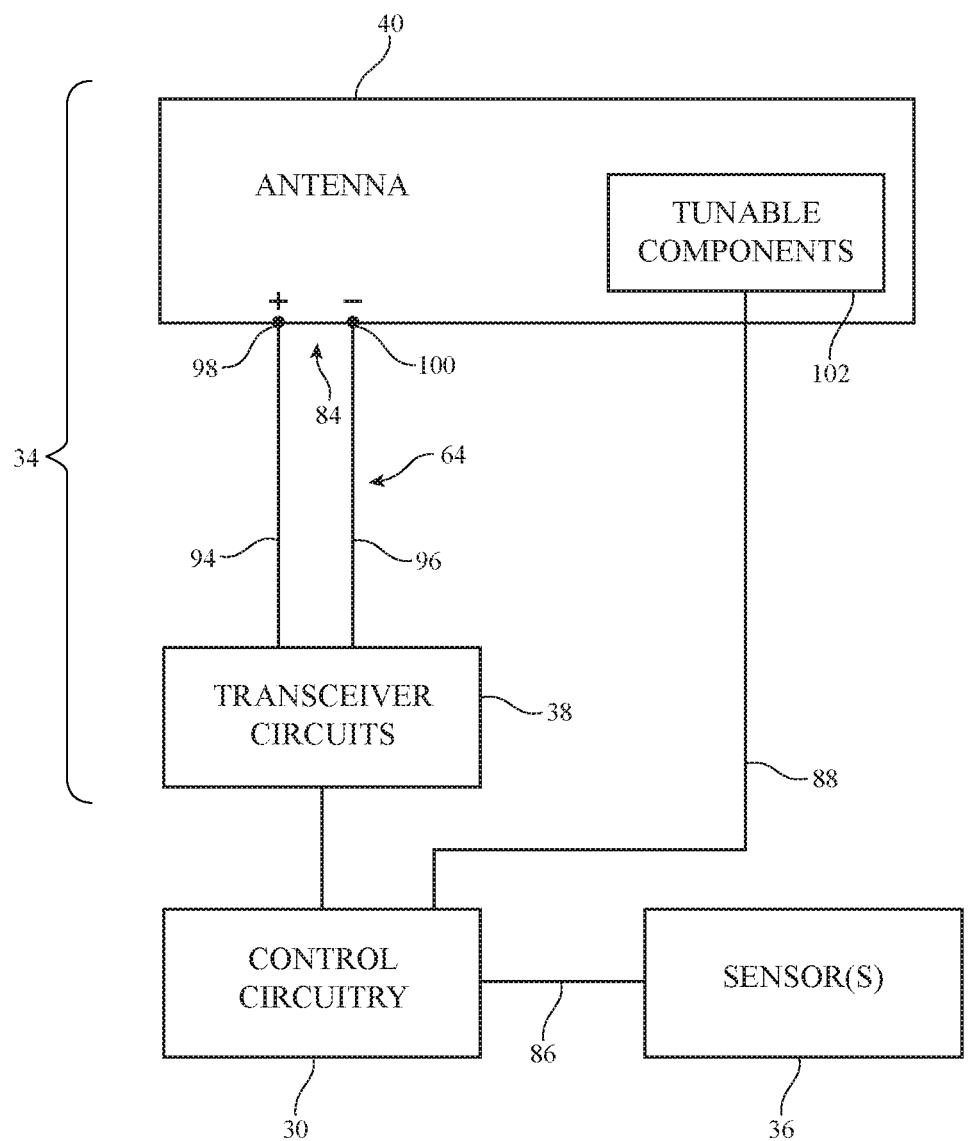
FIG. 3 is a diagram of illustrative wireless circuitry for use in a stylus in accordance with an embodiment.

As shown in FIG. 3, transceiver circuitry 38 in wireless communications circuitry 34 may be coupled to antenna 40 using paths such as transmission line path 64. Wireless communications circuitry 34 may be coupled to storage and processing circuitry 30. Storage and processing circuitry 30 may be coupled to sensors 36 over paths such as sensor data path 86.

Sensor data path 86 may include one or more conductive lines (e.g., conductive traces, wires, or other conductors) for coupling sensors 36 to storage and processing circuitry 30. For example, sensor data path 86 may include one or more sensor data conductors that convey sensor signals gathered by sensors 36 to storage and processing circuitry 30 and one or more ground conductors that are coupled to ground in stylus 10. Sensor signals conveyed over sensor data path 86 may include alternating current signals provided at frequencies that are much lower than the radio-frequencies handled by transceiver circuitry 38 (e.g., between 1 MHz and 5 MHz, below 1 MHz, or any other desired frequency below 600 MHz). Storage and processing circuitry 30 may also be coupled to other input-output devices 32 (FIG. 2) over respective data paths.

To provide antenna 40 with the ability to cover communications frequencies of interest, antenna 40 may be provided with circuitry such as filter circuitry (e.g., one or more passive filters and/or one or more tunable filter circuits). Discrete components such as capacitors, inductors, and resistors may be incorporated into the filter circuitry. Capacitive structures, inductive structures, and resistive structures may also be formed from patterned metal structures (e.g., part of an antenna).

If desired, antenna 40 may be provided with adjustable circuits such as tunable components 102 to tune antenna 40 over communications bands of interest. Tunable components 102 may include tunable inductors, tunable capacitors, or other tunable components. Tunable components such as these may be based on switches and networks of fixed components, distributed metal structures that produce associated distributed capacitances and inductances, variable solid state devices for producing variable capacitance and inductance values, tunable filters, or other suitable tunable structures. During operation of stylus 10, storage and processing circuitry 30 may issue control signals on one or more paths such as control path 88 that adjust inductance values, capacitance values, or other parameters associated with tunable components 102, thereby tuning antenna 40 to cover desired communications bands. Configurations in which antenna 40 is free of tunable components may also be used.

Transceiver circuitry 38 may be coupled to antenna 40 over a signal path such as transmission line path 64. Transmission line path 64 may include one or more radio-frequency transmission lines. As an example, transmission line path 64 of FIG. 3 may be a radio-frequency transmission line having a positive signal conductor such as positive signal conductor (line) 94 and a ground signal conductor such as ground conductor (line) 96. Conductors 94 and 96 may form parts of a coaxial cable or a microstrip transmission line (as examples). A matching network formed from components such as inductors, resistors, and capacitors may be used in matching the impedance of antenna 40 to the impedance of transmission line path 64. Matching network components may be provided as discrete components (e.g., surface mount technology components) or may be formed from housing structures, printed circuit board structures, traces on plastic supports, etc. Components such as these may also be used in forming filter circuitry in antenna 40.

Transmission line path 64 may be coupled to antenna feed structures associated with antenna 40. As an example, antenna 40 may form an inverted-F antenna, a slot antenna, a hybrid inverted-F slot antenna or other antenna having an antenna feed 84 with a positive antenna feed terminal such as terminal 98 and a ground antenna feed terminal such as terminal 100. Positive signal conductor 94 may be coupled to positive antenna feed terminal 98 and ground conductor 96 may be coupled to ground antenna feed terminal 100. Other types of antenna feed arrangements may be used if desired. The illustrative feeding configuration of FIG. 3 is merely illustrative.

Storage and processing circuitry 30 may use the sensor signals gathered by sensors 36 and received over sensor data path 86 to perform any desired operations on device 10. For example, storage and processing circuitry 30 may control other input-output devices 32 (FIG. 2) based on the sensor signals. In another suitable arrangement, storage and processing circuitry 30 may adjust antenna 40 (e.g., using control signals provided to tunable components 102 over control path 88) based on the sensor signals. Control circuitry 30 may generate sensor data based on the sensor signals received over sensor data path 86. Control circuitry 30 may transmit the sensor data to transceiver circuitry 38. Transceiver circuitry 38 may generate radio-frequency sensor data based on the sensor data received from control circuitry 30. Transceiver circuitry 38 may use antenna 40 to transmit the radio-frequency sensor data to tablet computer 20 over wireless link 28 (FIG. 1).

Transmission line paths in device 10 such as transmission line path 64 may be integrated into rigid and/or flexible printed circuit boards. In one suitable arrangement, transmission line paths such as transmission line path 64 may also include transmission line conductors (e.g., positive signal conductors 94 and ground conductors 96) integrated within multilayer laminated structures (e.g., layers of a conductive material such as copper and a dielectric material such as a resin that are laminated together without intervening adhesive). The multilayer laminated structures may, if desired, be folded or bent in multiple dimensions (e.g., two or three dimensions) and may maintain a bent or folded shape after bending (e.g., the multilayer laminated structures may be folded into a particular three-dimensional shape to route around other device components and may be rigid enough to hold its shape after folding without being held in place by stiffeners or other structures). All of the multiple layers of the laminated structures may be batch laminated together (e.g., in a single pressing process) without adhesive (e.g., as opposed to performing multiple pressing processes to laminate multiple layers together with adhesive).

Figure 4:
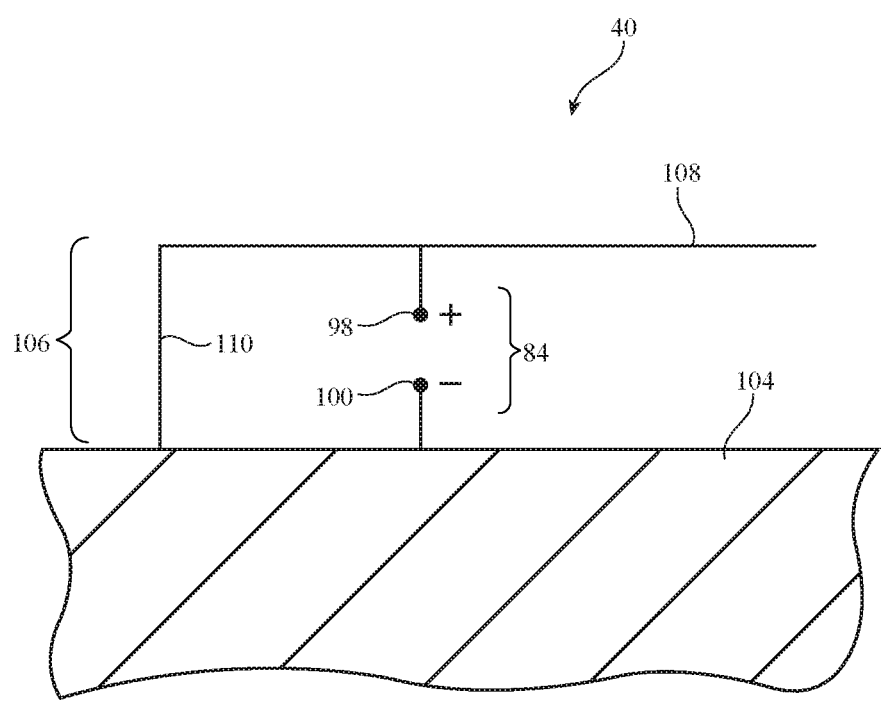
FIG. 4 is a diagram of an illustrative inverted-F antenna for a stylus in accordance with an embodiment.

FIG. 4 is a diagram of illustrative inverted-F antenna structures that may be used in implementing antenna 40 for stylus 10. Inverted-F antenna 40 of FIG. 4 has antenna resonating element 106 and antenna ground 104 (sometimes referred to herein as ground structures 104, ground plane 104, or ground 104). Antenna resonating element 106 (sometimes referred to herein as antenna radiating element 106) may have a main resonating element arm such as arm 108 (sometimes referred to herein as antenna resonating element arm 108, antenna radiating element arm 108, radiating arm 108, or arm 108). The length of antenna resonating element arm 108 may be selected so that antenna 40 resonates at desired operating frequencies. For example, the length of antenna resonating element arm 108 may be a quarter of a wavelength at a desired operating frequency for antenna 40 (e.g., 2.4 GHz). Antenna 40 may also exhibit resonances at harmonic frequencies.

Antenna resonating element arm 108 may be coupled to ground 104 by return path 110. Antenna feed 84 may include positive antenna feed terminal 98 and ground antenna feed terminal 100 and may run parallel to return path 110 between antenna resonating element arm 108 and ground 104. If desired, inverted-F antennas such as illustrative antenna 40 of FIG. 4 may have more than one resonating arm branch (e.g., to create multiple frequency resonances to support operations in multiple communications bands) or may have other antenna structures (e.g., parasitic antenna resonating elements, tunable components such as components 102 of FIG. 3 to support antenna tuning, etc.). Antenna resonating element arm 108 may follow a meandering path or may have other shapes if desired (e.g., shapes having curved and/or straight segments).

In mounting antenna 40 in stylus 10, the structures of antenna 40 may be curved. For example, ground 104 and/or antenna resonating element 106 may be formed from metal that wraps around longitudinal axis 12 of stylus 10 (FIG. 1). Ground 104 and/or antenna resonating element 106 may be curved in three-dimensions (e.g., ground 104 and/or antenna resonating element 106 may be formed from conductive traces having a concave shape or dome-shape that extends over end 18 of stylus 10 as shown in FIG. 1). The example of FIG. 4 is merely illustrative and, if desired, antenna 40 may be implemented using other types of antenna structures.

Antenna 40 may be formed from conductive structures such as metal structures. The metal structures of antenna 40 may be metal coating layers, portions of a device housing or other structural metal member, portions of a metal tube, metal foil, wires, or other metal structures.

Figure 5:
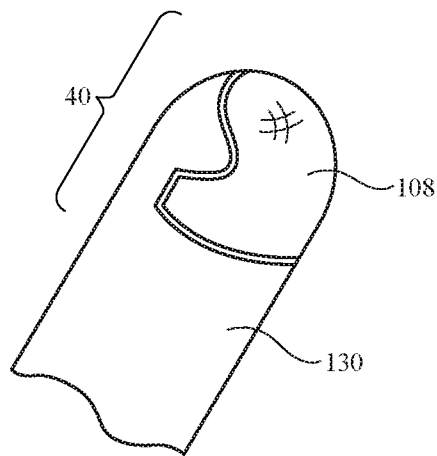
FIG. 5 is a perspective view of an illustrative antenna formed using laser direct structuring techniques in accordance with an embodiment.

In the illustrative configuration of FIG. 5, antenna 40 includes three-dimensional metal antenna resonating element arm 108 on three-dimensional (non-planar) dielectric support 130. Dielectric support 130 may be, for example, a support formed from a dielectric such as plastic (e.g., molded plastic). The plastic material that forms support 130 may be provided with metal particles or other filler material that sensitizes support 130 to exposure from laser light. Following exposure to laser light, portions of support 130 that have been exposed to laser light will promote coating with electroplated metal, whereas portions of support 130 that have not been exposed to laser light will not promote electroplating metal growth. With this approach, which may sometimes be referred to as laser direct structuring (LDS), metal structures such as metal antenna resonating element arm 108 of FIG. 5 may be deposited using electroplating. The metal antenna structures that are grown in this way can be three-dimensional (i.e., a curved surface such as the curved surface of illustrative support structure 130 of FIG. 5 can be coated with metal). Use of a three-dimensional antenna structure may help create a desired antenna radiation pattern for antenna 40 while accommodating antenna 40 within a housing of a desired shape.

Figure 6:
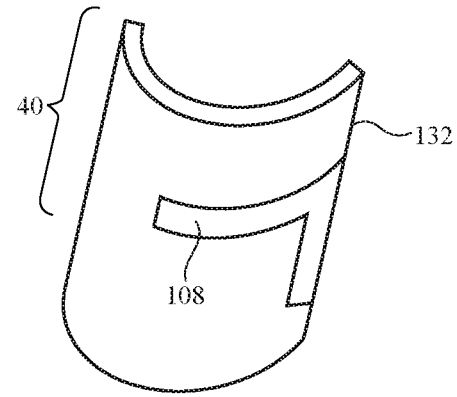
FIG. 6 is a perspective view of an illustrative flexible printed circuit antenna in accordance with an embodiment.

In the example of FIG. 6, metal traces for antenna resonating element arm 108 have been deposited and patterned on a flexible substrate such as flexible substrate 132. The metal for forming antenna structures such as antenna resonating element arm 108 can be deposited as a blanket metal coating and subsequently patterned using photolithography and metal etching (as an example). Flexible substrate 132 may be a flexible printed circuit formed from a polyimide substrate or a flexible layer of other polymer material. When installed in stylus 10, flexible substrate 132 may wrapped around the elongated body of stylus 10 (e.g., around longitudinal axis 12 of FIG. 1).

Figure 7:
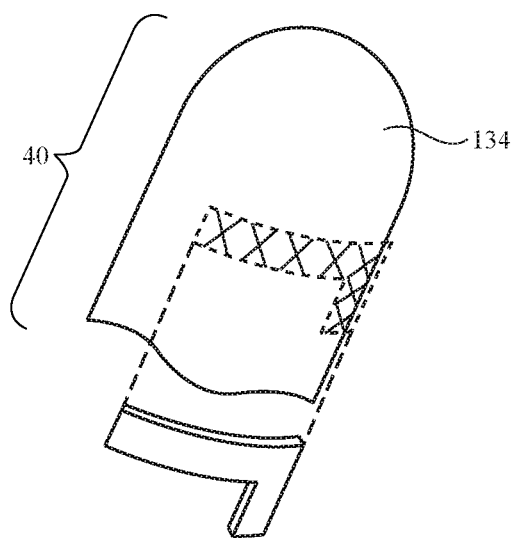
FIG. 7 is a perspective view of an illustrative antenna with a metal resonating element mounted to a support structure in accordance with an embodiment.

FIG. 7 is an exploded perspective view of an illustrative antenna resonating element arm 108 for antenna 40 that is formed from a metal member (e.g., stamped metal foil, etc.) that is attached to dielectric support member 134 using adhesive 136. Support member 134 may be formed from plastic or other dielectric materials and may form a portion of the elongated body of stylus 10.

Figure 8:
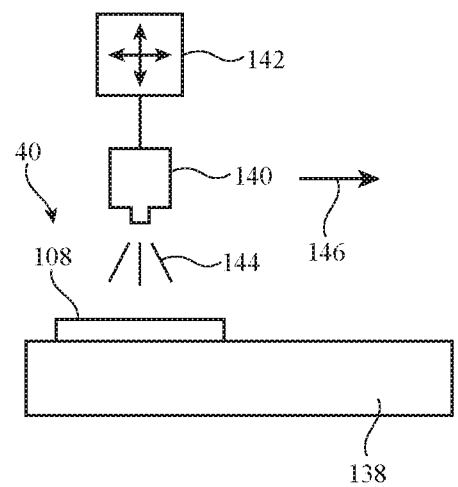
FIG. 8 is a cross-sectional side view of an illustrative antenna formed from printed conductive ink in accordance with an embodiment.

FIG. 8 is a diagram showing how metal antenna resonating element arm 108 and other antenna structures may be formed by printing conductive ink 144 onto the surface of dielectric support 138. Dielectric support 138 may be a planar substrate such as a printed circuit substrate or may be a molded plastic support or other structure that has a three-dimensional shape. Ink-jet dispenser 140 may be controlled using computer-controlled positioner 142. When moved in direction 146, dispenser 140 may deposit metal ink or other conductive ink 144 onto support structure 138, thereby forming a desired shape for antenna resonating element arm 108 of antenna 40. Conductive ink (e.g., binder material that contains metal particles or other conductive particles) may be applied to a support structure using ink-jet printing, screen printing, pad printing, spraying, dipping, dripping, painting, or other suitable deposition techniques.

The antenna metal structure fabrication techniques described in connection with FIGS. 5-8 are merely illustrative. Antenna structures may be formed from portions of metal housings (e.g., metal tubes that form structures for the elongated body of stylus 10), internal metal members, metal traces on flexible printed circuits, three-dimensional metal traces (e.g., laser patterned traces) on molded plastic substrates and other three-dimensional dielectric substrates, metal wires, metal foil (e.g., metal foil that has been patterned into the shape of an antenna structure and that is attached to a support structure using adhesive, screws, or other attachment mechanisms).

Figure 9:
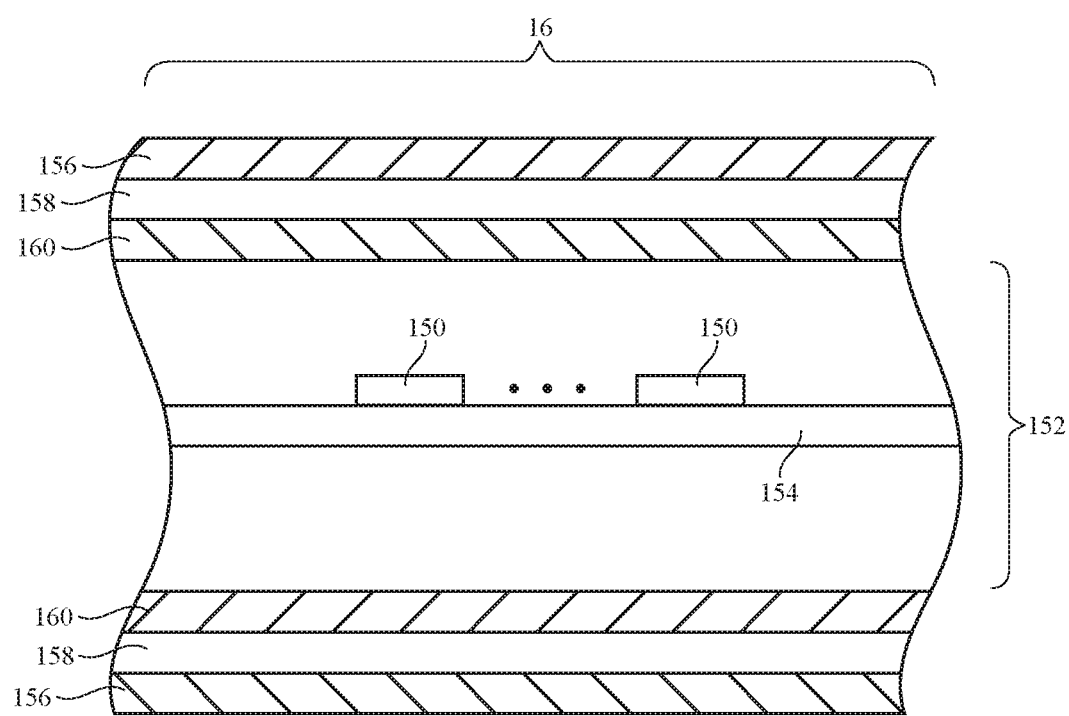
FIG. 9 is a cross-sectional side view of a portion of an elongated body for a stylus in accordance with an embodiment.

The housing of stylus 10 may be formed from metal, plastic, carbon-fiber composites and other fiber composites, glass, ceramic, other materials, and combinations of these materials. A cross-sectional side view of a shaft 16 of the elongated body of stylus 10 (FIG. 1) is shown in FIG. 9. As shown in FIG. 9, electrical components 150 may be mounted within interior cavity 152 of the elongated body of stylus 10. Components 150 may include integrated circuits, sensors, battery structures, connectors, switches, and other circuitry (e.g., storage and processing circuitry 30 and/or input-output circuitry 42 of FIG. 2). Components 150 may be mounted on one or more substrates such as substrate 154. Substrate 154 may be a dielectric support structure such as a printed circuit (e.g., a rigid printed circuit formed from a rigid printed circuit board material such as fiberglass-filled epoxy or a flexible printed circuit formed from a flexible sheet of polyimide or other flexible polymer layer).

Interior cavity 152 may be surrounded by one or more layers of material such as layers 156, 158, and 160. These layers of material may form concentric cylindrical tubes and may be formed from metal, plastic, glass, ceramic, other materials, and/or two or more of these materials. As an example, outer layer 156 may form a plastic tube that serves as a cosmetic exterior for stylus 10, intermediate layer 158 may form a metal tube that provides stylus 10 with structural support, and inner layer 160 may form a plastic tube that serves as a support structure. In general, tube 156 may be formed from metal, plastic, carbon fiber, ceramic, or other materials, tube 158 may be formed from metal, plastic, carbon fiber, ceramic, or other materials, and tube 160 may be formed from metal, plastic, carbon fiber, ceramic, or other materials. With another illustrative arrangement, inner tube 160 may be omitted, tube 156 may be formed from metal, plastic, or other materials and tube 158 may be formed from metal, plastic, or other materials. Configurations in which shaft 16 includes a single tube or includes solid portions without significant interior cavity portions may also be used.

Figure 10:
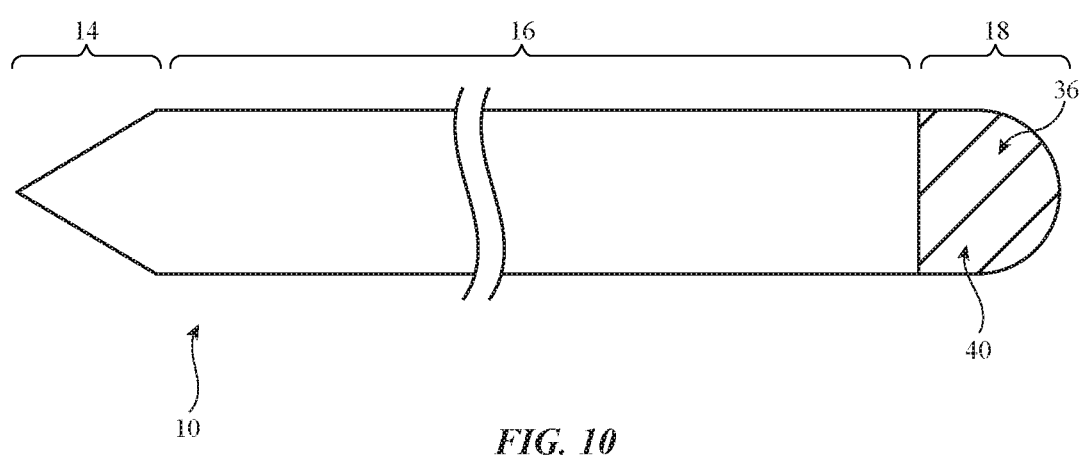
FIG. 10 is a side view of an illustrative stylus having a tip and an opposing end at which an antenna and a sensor have been formed in accordance with an embodiment.

As shown in the cross-sectional side view of stylus 10 of FIG. 10, antenna 40 may be formed at end 18 of stylus 10. With this type of arrangement, the risk of inadvertently blocking antenna 40 with the hand of a user may be minimized. One or more sensors 36 may also be formed at end 18 of stylus 10. Antenna 40 and sensor 36 may both be formed using metal structures at end 18 of stylus 10 (e.g., metal structures such as conductive traces on an underlying substrate or other metal structures as described above in connection with FIGS. 5-8). The metal structures used to form antenna 40 may include, for example, conductive traces that form antenna resonating element 106 (FIG. 4). The metal structures used to form sensor 36 may include, for example, conductive electrodes (e.g., capacitive and/or resistive electrodes), conductive traces, other conductive structures, and/or portions of sensor data path 86 (FIG. 3).

If care is not taken, the metal structures used to form sensor 36 may block radio-frequency signals that are transmitted or received by antenna 40, harmonics of the sensor signals generated by sensor 36 may interfere with the radio-frequency signals handled by antenna 40, and/or the radio-frequency signals handled by antenna 40 may interfere with sensor signals generated by sensor 36. In order to generate reliable sensor signals, the metal structures used to form sensor 36 may be coupled to ground within stylus 10. For example, the metal structures may be shorted (grounded) to tube 158 in shaft 16 in scenarios where tube 158 is formed from metal (FIG. 9). Tube 158 may sometimes be referred to herein as metal tube 158. If care is not taken, grounding the metal structures of sensor 36 may limit the antenna efficiency of antenna 40 in the frequency band of operation for antenna 40. For example, the presence of grounded metal structures in sensor 36 may reduce the antenna efficiency of antenna 40 by 6 dB or greater at Bluetooth frequencies (e.g., 2.4 GHz) relative to scenarios where sensor 36 is omitted from end 18 of stylus 10.

Figure 11:
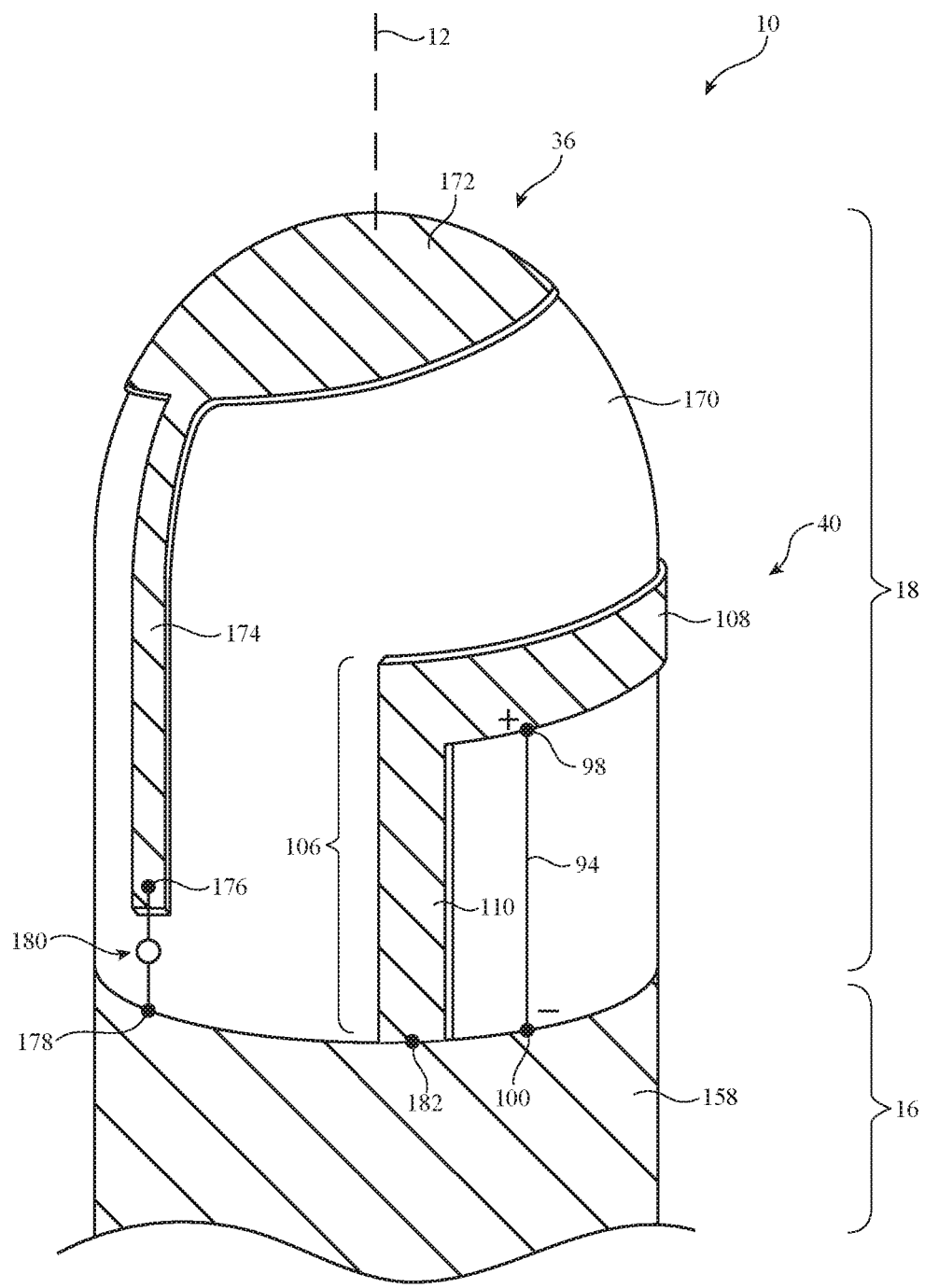
FIG. 11 is a perspective view of an illustrative antenna and sensor mounted at the end of a stylus in accordance with an embodiment.

FIG. 11 is a perspective view of end 18 of stylus 10 showing one example of how sensor 36 and antenna 40 may be implemented to mitigate these issues. Antenna 40 and sensor 36 may both be formed from conductive structures such as metal traces (or other metal structures as described above in connection with FIGS. 5-8) formed on a three-dimensional support structure such as support structure 170 at end 18 of stylus 10. Support structure 170 may be formed from molded plastic, ceramic, polymers, glass, or any other desired dielectric materials and may sometimes be referred to herein as dielectric substrate 170 or substrate 170. Substrate 170 may be hollow or may have hollow portions (interior cavities). Substrate 170 may have a cylindrical shape, a dome shape (e.g., a spherical or elliptical dome shape or other curved shape having a radius of curvature pointed towards tip 14 of FIG. 1), a prismatic shape, or combinations of these and/or other shapes, as examples. The conductive structures (e.g., metal traces) used to form antenna 40 and sensor 36 may conform to the shape of the underlying substrate 170 (e.g., the conductive structures used to form antenna 40 and sensor 36 may be cylindrically shaped, dome-shaped, etc.).

Antenna 40 may be an inverted-F antenna and the metal traces may include a portion that forms antenna resonating element 106 on substrate 170 (e.g., antenna resonating arm 108 and return path 110 of FIG. 4). Antenna 40 may include an antenna ground formed from metal tube 158 within shaft 16 of stylus 10 (e.g., ground 104 of FIG. 4). Antenna resonating element 106 may be shorted (grounded) to metal tube 158 at point 182. Antenna resonating element 106 may be coupled to metal tube 158 at point 182 using solder, welds, conductive adhesive, a conductive screw, conductive pin, conductive spring, and/or any other desired conductive interconnect structures. In another suitable arrangement, antenna resonating element 106 may be formed from an integral portion of metal tube 158 that extends over substrate 170.

Antenna resonating element arm 108 may extend from return path 110 and around longitudinal axis 12 (e.g., around the circumference of substrate 170). For example, antenna resonating element arm 108 may extend at least 120 degrees around longitudinal axis 12, at least 150 degrees around longitudinal axis 12, at least 180 degrees around longitudinal axis 12, at least 210 degrees around longitudinal axis 12, at least 270 degrees around longitudinal axis 12, 240 degrees around longitudinal axis 12, between 180 and 250 degrees around longitudinal axis 12, or any other desired angle between approximately 120 degrees and 270 degrees around longitudinal axis 12.

Transmission line path 64 (FIG. 3) may be implemented using a coaxial cable or other transmission line structure having a ground conductor coupled to ground antenna feed terminal 100 on metal tube 158 and a positive signal conductor 94 coupled to positive antenna feed terminal 98 on antenna resonating element arm 108. In another suitable arrangement, ground antenna feed terminal 100 may be coupled to additional metal traces on substrate 170.

The ground conductor and positive signal conductor 94 may extend parallel to longitudinal axis 12 to internal components such as electrical components 150 (FIG. 9) mounted within shaft 16 (e.g., internal components such as transceiver circuitry 38 of FIG. 2). Positive signal conductor 94 may include a conductive wire, conductive trace, or other conductive line that extends from the interior of metal tube 158 (e.g., interior cavity 152 of FIG. 9) to positive antenna feed terminal 98 over an exterior surface of substrate 170. In another suitable arrangement, positive signal conductor 94 may extend through a hollow interior of substrate 170 to positive antenna feed terminal 98 (e.g., a via, conductive pin, conductive spring, or other conductive interconnect may be used to couple conductive lines located within the hollow interior of substrate 170 to the location of positive antenna feed terminal 98 at the exterior of substrate 170). If desired, positive signal conductor 94 may include both portions that extend within the interior of substrate 170 and portions that extend external to substrate 170.

Sensor 36 may include conductive structures 172 on substrate 170. Conductive structures 172 may include one or more conductive electrodes for sensor 36, for example. Conductive structures 172 may be formed from metal traces on substrate 170 or from other metal structures such as the metal structures described above in connection with FIGS. 5-8. Conductive structures 172 may sometimes be referred to herein as sensor traces 172, sensor electrodes 172, conductive electrode(s) 172, or sensor conductor 172. Antenna resonating element arm 108 may be interposed between sensor traces 172 and shaft 16 (metal tube 158). This may, for example, allow sensor 36 to serve as a digital eraser for stylus 10 when interacting with tablet computer 20 (FIG. 1) and/or to gather sensor signals associated with objects that come into proximity or contact with end 18 of stylus 10.

Sensor signals gathered by sensor 36 may include capacitance information, resistance information, inductance information, thermal information, and/or any other desired sensor information gathered (sensed) by sensor traces 172 from the surroundings of stylus 10.

Sensor traces 172 may be coupled to storage and processing circuitry 30 over a sensor data path such as sensor data path 86 (FIG. 3). Sensor data path 86 may include one or more conductive lines such as one or more signal lines and one or more ground lines. Sensor 36 may include a conductive path such as sensor leg 174 that extends from sensor traces 172 towards metal tube 158. Sensor leg 174 and sensor traces 172 may be formed from the same piece of conductive material if desired (e.g., sensor traces 172 and sensor leg 174 may both be formed from metal traces patterned or deposited onto substrate 170).

Sensor leg 174 (sometimes referred to herein as conductive leg 174 or leg portion 174 of sensor traces 172) may be used to implement part of one or more conductive lines for sensor data path 86 of FIG. 3. For example, sensor leg 174 may be used to form one or more signal lines and/or one or more ground lines for sensor data path 86. Sensor leg 174 may include a terminal such as sensor terminal 176 located at the end of sensor leg 174 opposite to sensor traces 172.

Sensor terminal 176 may be coupled to storage and processing circuitry 30 within shaft 16. For example, portions of the signal lines and/or ground lines in sensor data path 86 may couple sensor terminal 176 to storage and processing circuitry 30. These portions of sensor data path 86 may extend from sensor terminal 176 into the interior of metal tube 158 at the exterior surface of substrate 170 and/or may extend through a hollow cavity within substrate 170 (e.g., these portions of sensor data path 86 may be coupled from the interior of substrate 170 to sensor terminal 176 using vias, pins, springs, or other conductive interconnects). In this case, antenna resonating element arm 108 can occupy larger amount of space than shown in FIG. 11 and may extend more than 360 degrees around substrate 170 if desired.

Sensor data path 86 (FIG. 3) may be grounded within stylus 10 to ensure that sensor 36 gathers accurate and reliable sensor signals during operation. For example, the ground lines in sensor data path 86 may be coupled to grounded structures within stylus 10 such as metal tube 158. If desired, one or more signal lines in sensor data path 86 may also be coupled to grounded structures within stylus 10 such as metal tube 158.

As shown in FIG. 11, in order to ensure that sensor data path 86 is grounded, sensor terminal 176 on sensor leg 174 may be coupled to ground terminal 178 on metal tube 158 (e.g., using solder, welds, conductive adhesive, conductive screws, conductive pins, conductive springs, etc.). Sensor terminal 176 may be coupled to storage and processing circuitry 30 (FIG. 3) within shaft 16 in addition to being coupled to ground terminal 178 on metal tube 158, if desired. In this way, sensor leg 174 may form part of a ground line for sensor data path 86 or may form part of a grounded signal line for sensor data path 86.

In practice, grounding sensor traces 172 may undesirably load of antenna 40 on substrate 170. If care is not taken, this loading may deteriorate the overall antenna efficiency of antenna 40 within the frequency band of operation of antenna 40. A filtering component such as filter 180 may be coupled between sensor terminal 176 and ground terminal 178 to mitigate this deterioration in antenna performance.

Filter 180 may include, for example, a choke inductor having a first terminal coupled to sensor terminal 176 and a second terminal coupled to ground terminal 178. The choke inductor may have an inductance that is selected so that filter 180 forms an open circuit at the radio-frequencies handled by antenna 40 (e.g., frequencies greater than 600 MHz) and so that filter 180 forms a short circuit path between sensor terminal 176 and ground terminal 178 at the frequencies of the sensor signals generated by sensor 36 (e.g., frequencies below 1 MHz, between 1 and 5 MHz, below 600 MHz, etc.). In this way, filter 180 may block radio-frequency signals (e.g., antenna currents at radio-frequencies) from being conveyed between sensor leg 174 and metal tube 158, even though sensor leg 174 is grounded to metal tube 158 at lower frequencies. Blocking the radio-frequency signals from being conveyed between sensor 36 and metal tube 158 may serve to isolate sensor 36 from antenna 40 (e.g., so that sensor 36 acts as a floating conductor above antenna 40 at radio-frequencies), thereby minimizing the loading of antenna 40 by sensor 36 and maximizing the overall antenna efficiency for antenna 40.

This example is merely illustrative and, in general, filter 180 may include a low pass filter, a high pass filter, a band pass filter, a notch filter, capacitors, resistors, or any other desired combination of any number of capacitors, resistors and/or inductors coupled in any desired manner between sensor terminal 176 and ground terminal 178. In another suitable arrangement, filter 180 may include a third terminal that is coupled to storage and processing circuitry 30 (e.g., a third terminal that is coupled to a portion of sensor data path 86 extending to storage and processing circuitry 30 of FIG. 3). In scenarios where filter 180 includes a third terminal coupled to storage and processing circuitry 30, sensor terminal 176 need not be separately coupled to storage and processing circuitry 30, if desired.

The example of FIG. 11 is merely illustrative. In general, sensor traces 172, sensor leg 174, and antenna resonating element 106 may have any desired shapes and sizes (e.g., shapes having any desired number of straight and/or curved edges). Additional signal lines and/or ground lines from sensor data path 86 (FIG. 3) may be coupled to any desired locations on sensor traces 172 and sensor leg 174.

The presence of sensor leg 174 may impose a limit on how far antenna resonating element arm 108 can extend around longitudinal axis 12. If desired, additional sensor legs may be coupled between sensor traces 172 and metal tube 158. Forming additional sensor legs in sensor 36 may further limit how far antenna resonating element arm 108 can extend around longitudinal axis 12. However, additional sensor legs may enhance the structural and mechanical integrity of sensor 36 relative to scenarios where only a single sensor leg is used, for example.

Figure 12:
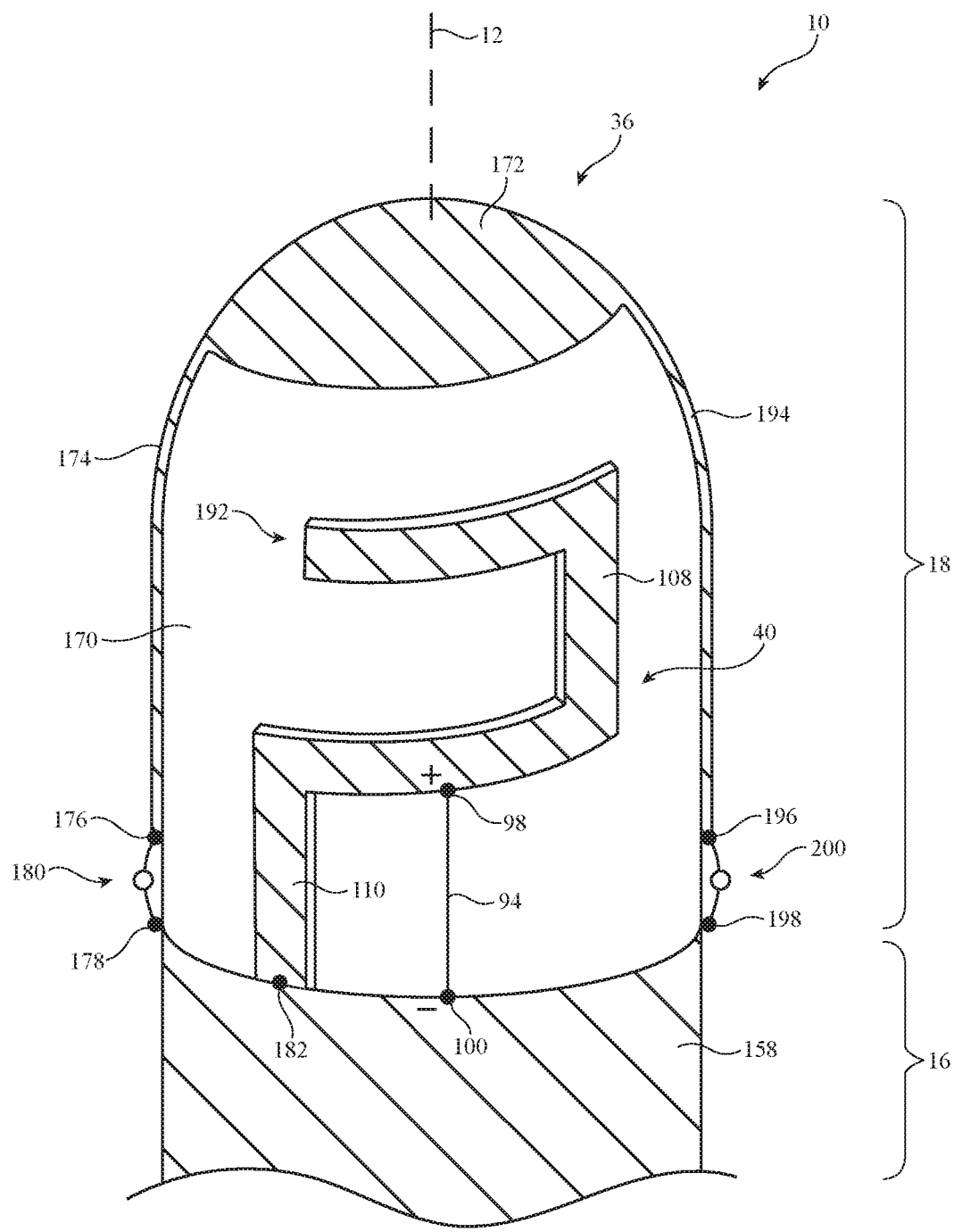
FIG. 12 is a perspective view of an illustrative sensor having a pair of conductive legs and an antenna mounted between the pair of conductive legs at the end of a stylus in accordance with an embodiment.

FIG. 12 is a perspective view of end 18 of stylus 10 showing how sensor 36 may include two sensor legs coupled between sensor traces 172 and metal tube 158. As shown in FIG. 12, sensor 36 may include an additional sensor leg 194 extending from sensor traces 172 towards metal tube 158. Sensor 36 may include a sensor terminal 196 at the end of sensor leg 194. Sensor terminal 196 may be coupled to ground terminal 198 on metal tube 158 (e.g., using solder, welds, conductive adhesive, conductive screws, conductive pins, conductive springs, etc.). Sensor terminal 196 may be coupled to storage and processing circuitry 30 (FIG. 3) within shaft 16 in addition to being coupled to ground terminal 178 on metal tube 158, for example. In this way, sensor leg 194 may form part of a ground line for sensor data path 86 or may form part of a grounded signal line for sensor data path 86.

In order to mitigate the impact of sensor 36 on antenna 40, a filtering circuit such as filter 200 may be coupled between sensor terminal 196 and ground terminal 198. Filter 200 may include, for example, a choke inductor having a first terminal coupled to sensor terminal 196 and a second terminal coupled to ground terminal 198. The choke inductor may have an inductance that is selected so that filter 200 forms an open circuit at the radio-frequencies and so that filter 200 forms a short circuit path between sensor terminal 196 and ground terminal 198 at the frequencies of the sensor signals generated by sensor 36. In this way, filter 200 may block radio-frequency signals (e.g., antenna currents at radio-frequencies) from being conveyed between sensor leg 194 and metal tube 158, even though sensor leg 194 is grounded to metal tube 158 at lower frequencies. Blocking the radio-frequency signals from being conveyed between sensor 36 and metal tube 158 may serve to isolate sensor 36 from antenna 40, thereby minimizing the loading of antenna 40 by sensor 36 and maximizing the overall antenna efficiency for antenna 40.

This example is merely illustrative and, in general, filter 200 may include a low pass filter, a high pass filter, a band pass filter, a notch filter, capacitors, resistors, or any other desired combination of any number of capacitors, resistors and/or inductors coupled in any desired manner between sensor terminal 196 and ground terminal 198. In another suitable arrangement, filter 200 may include a third terminal that is coupled to storage and processing circuitry 30 (e.g., a third terminal that is coupled to a portion of sensor data path 86 extending to storage and processing circuitry 30 of FIG. 3). In scenarios where filter 200 includes a third terminal coupled to storage and processing circuitry 30, sensor terminal 196 need not be separately coupled to storage and processing circuitry 30, if desired.

Forming sensor 36 with additional sensor leg 194 may enhance the structural and mechanical integrity of sensor 36 and end 18 of stylus 10 relative to scenarios where only a single sensor leg is used, for example. At the same time, the presence of additional sensor leg 194 of FIG. 12 may further limit the amount of surface area on substrate 170 that is available for antenna 40. If desired, sensor leg 174 may be rotationally separated from sensor leg 194 around longitudinal axis 12 by between 180 degrees and 270 degrees so that between 180 and 270 degrees of rotational area around longitudinal axis 12 is available for forming antenna 40 on substrate 170.

If desired, antenna resonating element arm 108 may include one or more bends so that antenna 40 may fit within the limited space between sensor legs 174 and 194. As shown in FIG. 12, antenna resonating element arm 108 may follow a path that extends from return path 110 to end (tip) 192 and that includes first and second bends or folds (e.g., perpendicular bends or bends of other angles). This may allow antenna resonating element arm 108 to have the same length (e.g., approximately one-quarter of the wavelength of operation of antenna 40) as in scenarios where only one sensor leg 174 is formed while conforming to the limited amount of space available between sensor legs 174 and 194 of FIG. 12, for example.

The example of FIG. 12 is merely illustrative. In general, antenna resonating element arm 108 may have any desired number of bends in any desired directions. A third sensor leg and/or additional sensor legs may be coupled to sensor traces 172 at the side of substrate 170 opposite to antenna 40 if desired.

Figure 13:
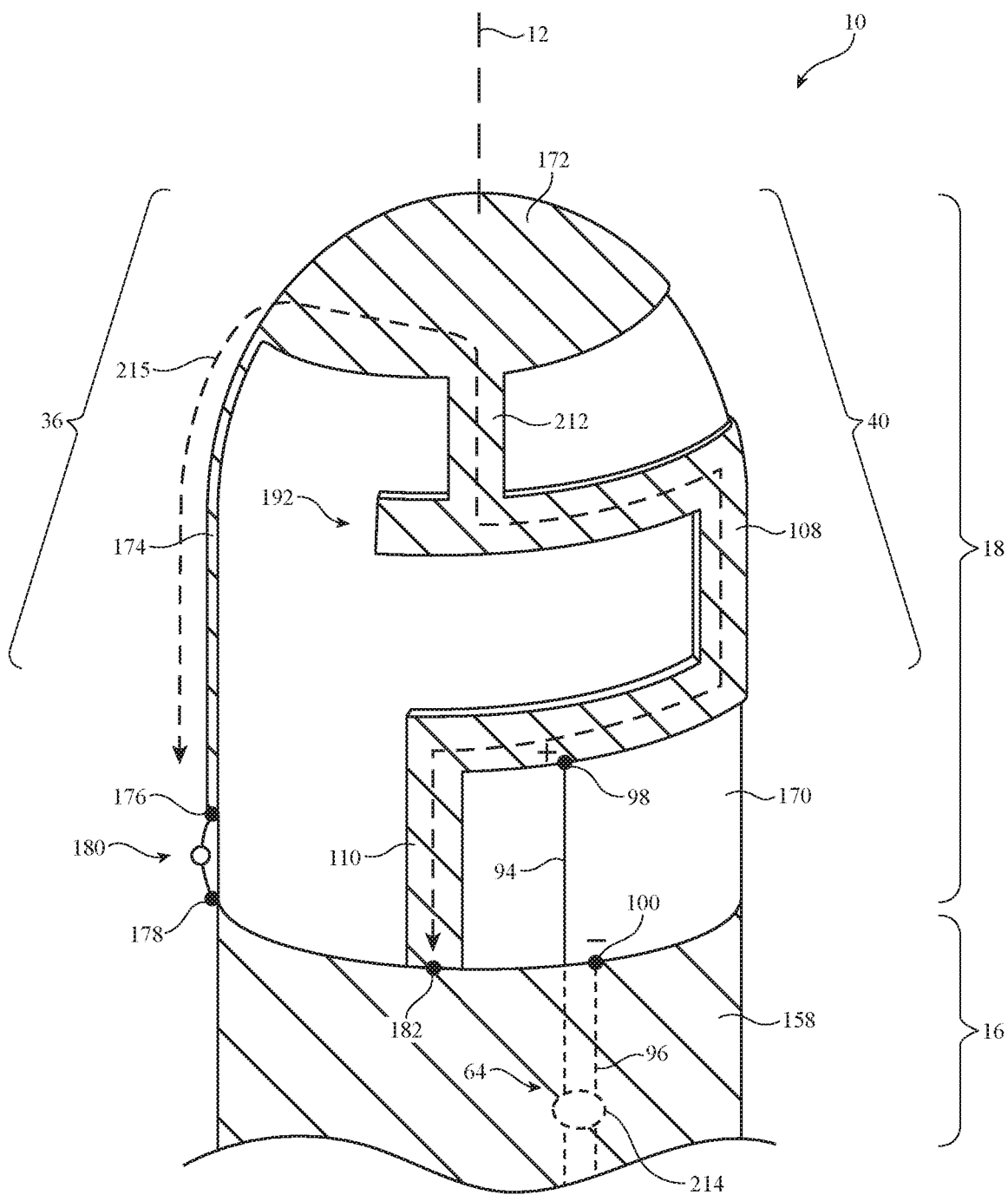
FIG. 13 is a perspective view of an illustrative antenna and sensor formed from shared conductive traces at the end of a stylus in accordance with an embodiment.

If desired, some or all of sensor 36 and antenna 40 may be formed from the same conductive structure (e.g., metal traces) on substrate 170 (e.g., sensor 36 and antenna 40 may be formed from shared conductive structures or metal traces on substrate 170). FIG. 13 is a perspective view of end 18 of stylus 10 showing how sensor 36 and antenna 40 may be formed from shared conductive structures on substrate 170.

As shown in FIG. 13, antenna resonating element arm 108 of antenna 40 may be coupled to sensor traces 172 over conductor 212 on substrate 170 (e.g., a conductive trace on substrate 170 that extends from sensor traces 172 to antenna resonating element arm 108). Conductive trace 212 may serve to short antenna resonating element arm 108 (e.g., end 192 of antenna resonating element arm 108) to sensor traces 172. When configured in this way, sensor 36 may also include some or all of antenna resonating element arm 108 and may use antenna resonating element arm 108 to gather sensor signals for storage and processing circuitry 30 (FIG. 2). At the same time, antenna 40 may also include some or all of sensor traces 172 and sensor leg 174 to convey radio-frequency signals.

For example, antenna currents at radio-frequencies may be conveyed to and from antenna 40 over antenna feed terminals 98 and 100. The antenna currents may flow over antenna resonating element arm 108, return path 110, metal tube 158, conductive trace 212, some or all of sensor traces 172, and sensor leg 174. In scenarios where filter 180 is a choke inductor coupled to ground terminal 178, sensor terminal 176 may form an open circuit to the antenna currents. This may extend the effective length of the antenna resonating element arm for antenna 40 to also include conductive structure 212, sensor traces 172, and sensor leg 174, as shown by path 215. This may allow antenna resonating element arm 108 to be reduced in size (e.g., to conform to a smaller amount of available area around longitudinal axis 12 on substrate 170) while still maintaining sufficient radiating length for antenna 40 (e.g., path 215 may be approximately one-quarter of the wavelength of operation of antenna 40).

In another suitable arrangement, filter 180 may be omitted and sensor terminal 176 may be shorted directly to ground terminal 178. When configured in this way, sensor leg 174 may serve as an additional return path between the antenna resonating element of antenna 40 and ground (metal tube 158). In yet another suitable arrangement, capacitive, resistive, and/or inductive components may be arranged within filter 180 to tune the frequency response of antenna 40.

As shown in FIG. 13, transmission line path 64 may be coupled to antenna feed terminals 98 and 100 (e.g., positive signal conductor 94 of transmission line path 64 may be coupled to positive antenna feed terminal 98 whereas ground conductor 96 of transmission line path 64 is coupled to ground antenna feed terminal 100). If desired, additional filtering circuitry such as filter 214 may be interposed on transmission line path 64. Filter 214 may, for example, include one or more capacitors interposed on conductors 96 and/or 94. The capacitors may have a capacitance selected to form a short circuit at radio-frequencies and to form an open circuit at lower frequencies such as the frequencies associated with the sensor signals gathered by sensor 36. This may serve to isolate transceiver circuitry 38 (FIG. 3) from the sensor signals if desired. In another suitable arrangement, additional filtering components may be formed within transceiver circuitry 38 and/or control circuit 30 (FIG. 3) to reduce signal interference between sensor 36 and antenna 40 if desired.

The example of FIG. 13 is merely illustrative. Additional sensor legs such as sensor leg 194 of FIG. 13 may be formed on substrate 170 (e.g., at a side of antenna 40 opposite to sensor leg 174). Conductive structure 212 may be coupled to antenna resonating element arm 108 at any desired location. Sharing conductive structures between antenna 40 and sensor 36 may optimize space consumption within end 18 of stylus 10 without significantly sacrificing wireless performance for antenna 40 or the performance of sensor 36, for example.

Figure 14:
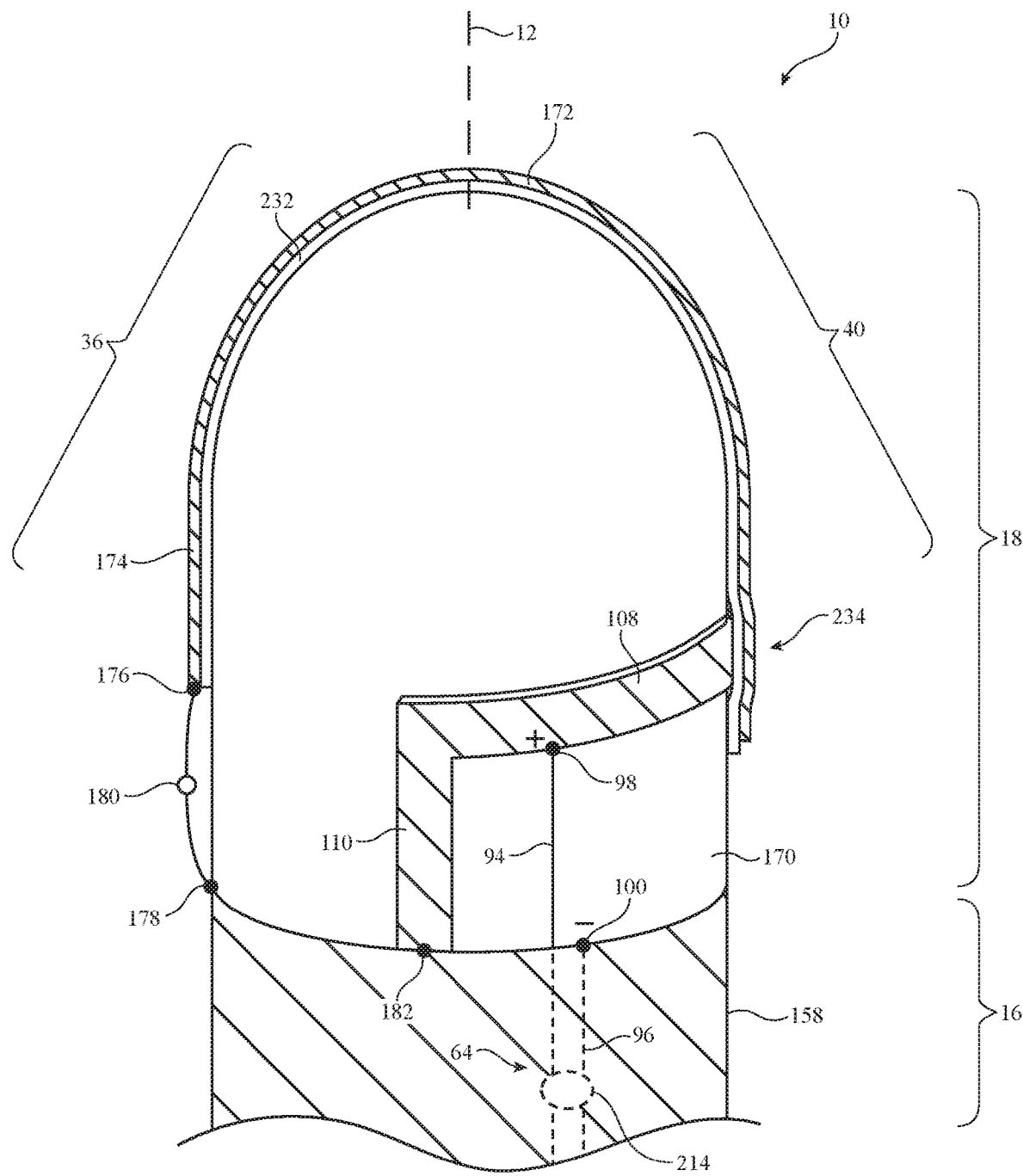
FIG. 14 is a perspective view of an antenna at the end of a stylus and a sensor that overlaps the antenna in accordance with an embodiment.

In another suitable arrangement, the conductive structures in sensor 36 may overlap with antenna resonating element arm 108 on substrate 170 (e.g., sensor 36 may be formed from conductive structures that overlap antenna resonating element arm 108 without contacting antenna resonating element arm 108). FIG. 14 is a perspective view of end 18 of stylus 10 showing how sensor 36 and antenna 40 may be formed from overlapping conductive structures on substrate 170.

As shown in FIG. 14, sensor traces 172 and sensor leg 174 may be formed on an additional dielectric substrate such as dielectric substrate 232. Dielectric substrate 232 may be a flexible printed circuit or other substrate that is bent around and conforms to the shape of substrate 170. Dielectric substrate circuit 232 may have an end that is mounted on or over antenna resonating element arm 108.

Sensor 36 may include a conductive segment 234 (e.g., a portion of sensor traces 172 or an additional sensor leg such as sensor leg 194 of FIG. 12) at the end of dielectric substrate 232 that overlaps antenna resonating element arm 108. Dielectric substrate 232 may isolate or separate conductive segment 234 from antenna resonating element arm 108 if desired. In this way, antenna 40 and sensor 36 may be formed from overlapping conductive structures. This may, for example, serve to optimize space consumption within end 18 of stylus 10 (e.g., antenna resonating element arm 108 may have sufficient length and sensor 36 may have a sufficient sensor signal collection area despite both antenna 40 and sensor 36 being confined to end 18 of stylus 10).

In another suitable arrangement, conductive segment 234 may be capacitively coupled to antenna resonating element arm 108 through dielectric substrate 232. In this scenario, a short circuit may be formed between antenna resonating element arm 108 and conductive segment 234 at radio-frequencies, thereby extending the effective radiating length of antenna 40 to also include conductive segment 234, sensor traces 172, and/or sensor leg 174. At the same time, dielectric substrate 232 may form an open circuit between conductive segment 234 and antenna resonating element arm 108 at lower frequencies such as frequencies associated with the sensor signals gathered by sensor 36 (e.g., dielectric substrate 232 may isolate antenna resonating element arm 108 from sensor signals generated by sensor 36 while also allowing portions of sensor 36 to form a part of antenna 40). The example of FIG. 14 is merely illustrative. Additional sensor legs may be coupled to sensor traces 172 if desired. Antenna resonating element arm 108 may have other shapes.

Figure 15:
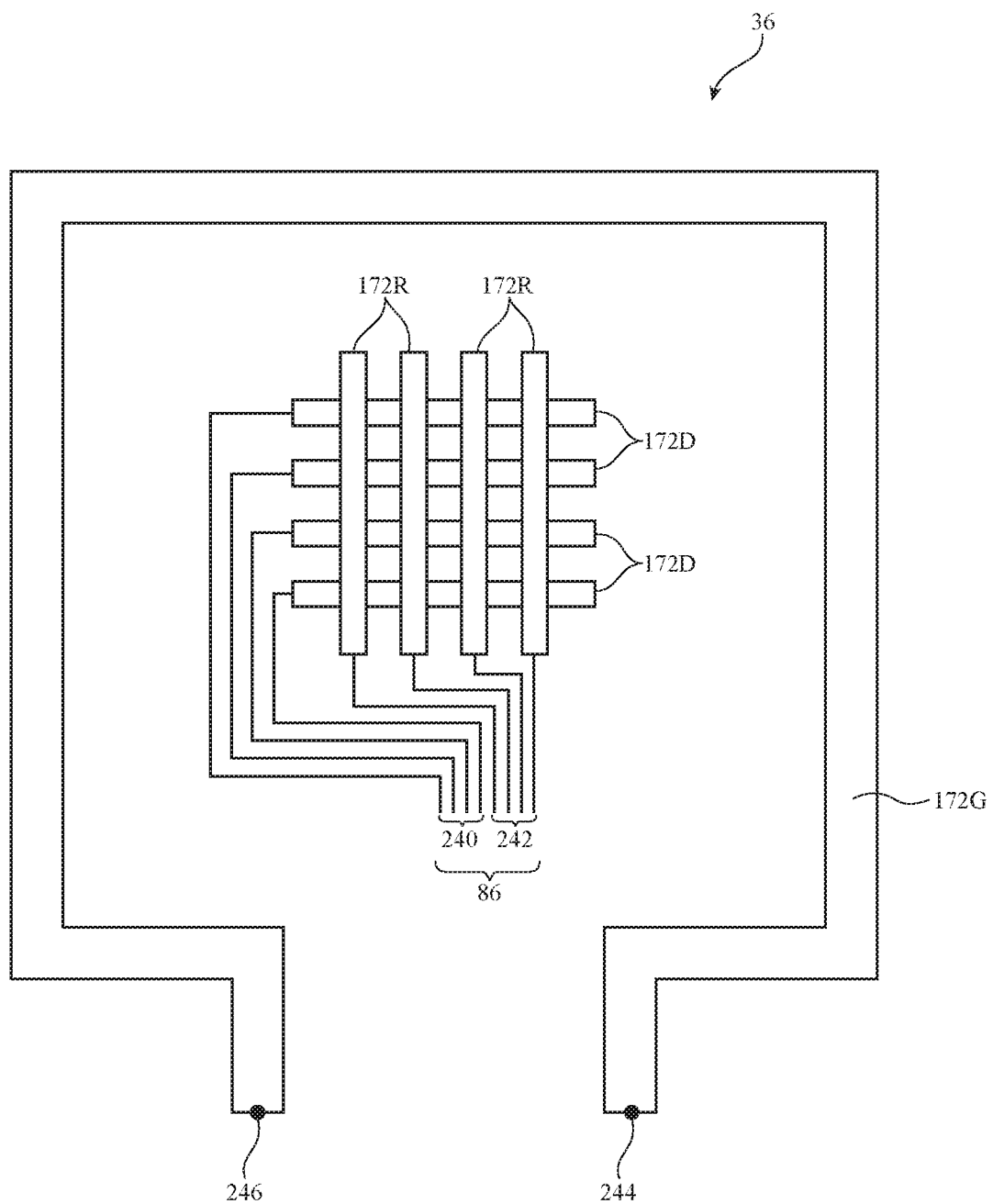
FIG. 15 is a diagram of conductive traces that may be used to form a sensor of the type shown in FIGS. 11-14 in accordance with an embodiment.

If desired, sensor traces 172 of FIGS. 11-14 may include multiple conductive traces such as driver traces, receiver traces, and ground traces. FIG. 15 is a top-down diagram showing how sensor traces 172 may include driver traces, receiver traces, and ground traces.

As shown in FIG. 15, sensor traces 172 of sensor 36 may include driver traces 172D, receiver traces 172R, and ground traces 172G. Driver traces 172D may be coupled to signal lines 240 of sensor data path 86. Receiver traces 172R may be coupled to signal lines 242 of sensor data path 86. Receiver traces 172R and driver traces 172D may be arranged in a grid or array pattern, as one example. In another suitable arrangement, traces 172R and 172D may be replaced by a grid or array of conductive patches. Receiver traces 172R may sometimes be referred to herein as receiver electrodes 172R. Driver traces 172D may sometimes be referred to herein as driver electrodes 172D.

Ground traces 172G (sometimes referred to herein as ground electrode 172G) may be held at a ground potential and may include a ring or loop-shaped electrode such that surrounds traces 172R and 172D, for example. Ground electrode 172 may be coupled to ground at terminal 246 and/or terminal 244. If desired, terminal 246 and/or terminal 244 may be coupled to metal tube 158 through corresponding sensor legs and filters (e.g., sensor legs such as sensor legs 174 and 194 and filters such as filters 180 and 200 of FIGS. 11-14). If desired, one or more of signal lines 240 and 242 may be coupled to one or more sensor legs (e.g., in scenarios where signal lines 240 and 242 are grounded along their length). In another suitable arrangement, terminal 246 may be coupled to conductive structure 212 and antenna resonating element arm 108 (FIG. 13). In these scenarios, terminal 244 may be coupled to metal tube 158 over a sensor feed leg such as sensor legs 174 and 194 of FIGS. 11-14. In yet another suitable arrangement, terminal 246 may form a ground antenna feed terminal such as ground antenna feed terminal 100 and terminal 244 may form a positive antenna feed terminal such as positive antenna feed terminal 98 of FIG. 3 (e.g., ground traces 172G need not be grounded and may, if desired, form a loop antenna resonating element for antenna 40 in scenarios where antenna 40 is a loop antenna).

Storage and processing circuitry 30 (FIG. 3) may drive signals onto driver traces 172D by providing drive signals (e.g., alternating current signals at relatively low frequencies such as 1 to 5 MHz) over signal lines 240. Receiver traces 172R may generate sensor signals corresponding to the drive signals used to driver traces 172D. For example, during operation, a user may swipe a finger or display 24 of tablet computer 20 (FIG. 1) across sensor 36. During this action, storage and processing circuitry 30 may drive the drive signals into driver traces 172D. This drive signals may be coupled into the user's finger (or display 24 of tablet computer 20) from driver traces 172D when the user's finger (or display 24) is placed over driver traces 172D (i.e., due to the contact of the user's finger or display 24 with at least some of driver traces 172D or due to the close proximity of the finger or display 24 to driver traces 172D in scenarios in which sensor traces 172 are separated from the exterior of stylus 10 by an air gap or a layer of plastic, glass, or other dielectric). The magnitude of the drive signals that are coupled to each of receiver traces 172R from the user's finger (or display 24) may be measured by monitoring the signals on signal lines 242. These signals may form sensor signals that are conveyed to storage and processing circuitry 30 over sensor data path 86, for example. The sensor signals may be indicative of a capacitance, resistance, and/or inductance between sensor 36 and an external object, indicative of an external force applied to sensor 36, etc. Storage and processing circuitry 30 may process the sensor signals to sense touch, proximity, force, etc.

The example of FIG. 15 is merely illustrative. Ground traces 172G, driver traces 172D, and receiver traces 172R may have any other desired shape, arrangement, and/or orientation. The conductive traces in sensor 36 may be provided with other arrangements if desired. Sensor 36 need not include a grid of driver and receiver traces surrounded by a ground trace. One or more of traces 172R, 172D, and 172G may be omitted if desired. Sensor 36 may include other components for forming other types of sensors if desired (e.g., temperature sensors, light sensors, orientation sensors, etc.). The structures shown in FIGS. 11-15 may be arranged in any desired combination. If desired, dielectric material such as a dielectric cap, an extension of outer tube 156 of FIG. 9, a cosmetic layer, an ink layer, and/or other dielectric layers or structures may cover antenna 40, sensor 36, and/or substrate 170 (e.g., to protect these components from damage or contaminants, to hide these components from view of a user, etc.).

Figure 16:
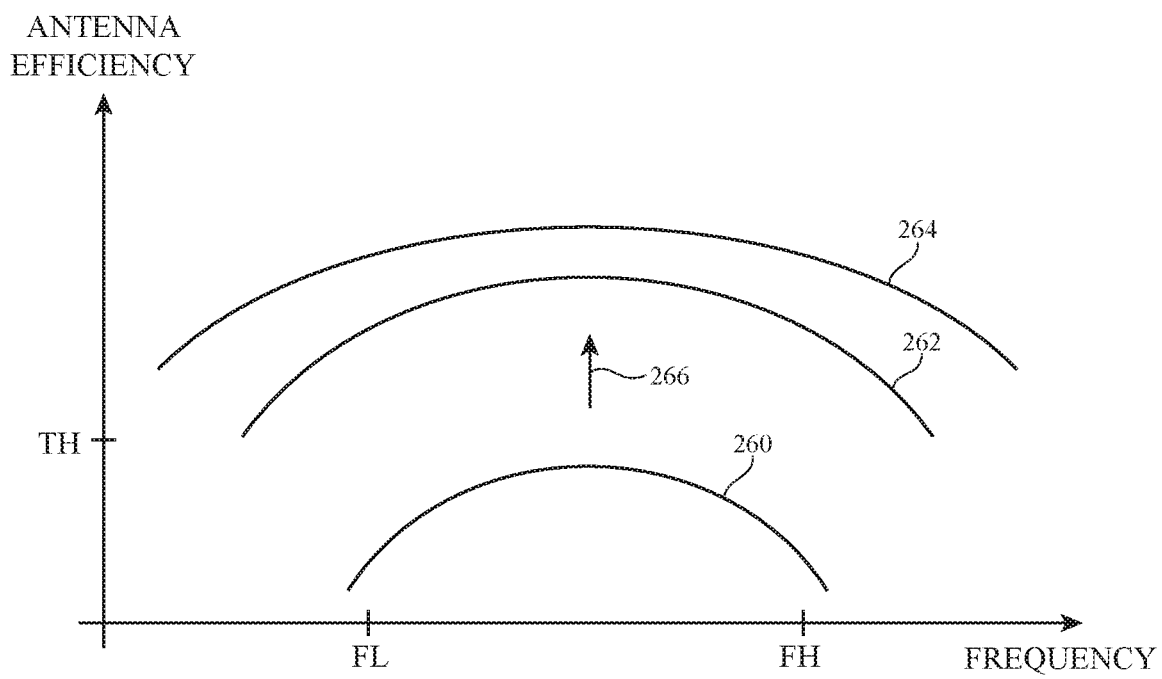
FIG. 16 is a graph of antenna performance (antenna efficiency) for an antenna of the type shown in FIGS. 11-14 in accordance with an embodiment.

FIG. 16 is a graph in which antenna performance (antenna efficiency) has been plotted as a function of operating frequency for antenna 40 of FIGS. 11-15. As shown in FIG. 16, curve 264 plots an exemplary antenna efficiency of antenna 40 in a free space environment (e.g., in the absence of sensor 36 at end 18 of stylus 10). As shown by curve 264, antenna 40 may exhibit a satisfactory antenna efficiency (e.g., an antenna efficiency above threshold level TH) across a desired frequency range of operation defined by lower frequency FL and upper frequency FH. Lower frequency FL may be approximately 2380 MHz and upper frequency FH may be approximately 2484 MHz in one suitable arrangement (e.g., the frequency range of operation may include a Bluetooth frequency band at 2.4 GHz).

Curve 260 plots the antenna efficiency for antenna 40 in the presence of grounded sensor traces 172. As shown by curve 260, the presence of grounded sensor traces 172 may load antenna 40 and deteriorate the performance of antenna 40 to unsatisfactory levels between frequencies FL and FH (e.g., to below threshold level TH). Coupling sensor traces 172 to ground using filter circuits such as filter circuits 180 and 200 of FIGS. 11-14 may serve to electromagnetically isolate antenna 40 from sensor 36 between frequencies FL and FH. This may serve to increase the antenna efficiency of antenna 40 (e.g., as shown by arrow 266), so that antenna 40 exhibits an antenna efficiency associated with curve 262 of FIG. 16. As shown by curve 262, antenna 40 may exhibit satisfactory antenna efficiency over the entire frequency range between frequencies FL and FH. In this way, both sensor 36 and antenna 40 may be formed from conductive structures (e.g., conductive traces) on substrate 170 at end 18 of stylus 10 without sacrificing wireless performance for antenna 40 or accuracy for sensor 36.

The example of FIG. 16 is merely illustrative. In general, antenna 40 may cover any desired bands at any desired frequencies (e.g., antenna 40 may exhibit any desired number of efficiency peaks extending over any desired frequency bands). Curves 260, 262, and 264 may exhibit other shapes if desired.

The foregoing is merely illustrative and various modifications can be made by those skilled in the art without departing from the scope and spirit of the described embodiments. The foregoing embodiments may be implemented individually or in any combination.

What is claimed is:

1. A computer stylus, comprising:
    an elongated body having a tip and an opposing end coupled by a shaft that extends along a longitudinal axis;
    a dielectric substrate at the end of the elongated body;
    conductive traces on the dielectric substrate, wherein the conductive traces form part of a sensor and part of an antenna for the computer stylus, wherein the conductive traces comprise a sensor electrode for the sensor; and
    a metal tube that forms at least part of the shaft, wherein the sensor has a sensor leg that couples the sensor electrode to the metal tube.

2. The computer stylus defined in claim 1, wherein the conductive traces comprise and an antenna resonating element for the antenna.

3. The computer stylus defined in claim 2 wherein the sensor leg is coupled to the metal tube through a filter.

4. The computer stylus defined in claim 3, wherein the antenna is configured to transmit radio-frequency signals at a first frequency that is greater than 600 MHz, the sensor is configured to generate sensor signals at a second frequency that is less than 600 MHz, the filter is configured to form an open circuit between the sensor electrode and the metal tube at the first frequency, and the filter is configured to form a short circuit between the sensor electrode and the metal tube at the second frequency.

5. The computer stylus defined in claim 4, wherein the filter comprises a choke inductor.

6. The computer stylus defined in claim 3, wherein the metal tube forms a ground for the antenna, the antenna resonating element comprising an antenna resonating element arm and a return path coupled between the antenna resonating element arm and the metal tube.

7. The computer stylus defined in claim 6, wherein the conductive traces comprise an additional sensor leg coupled to the sensor electrode, the electronic device further comprising:
an additional filter coupled between the additional sensor leg and the metal tube.

8. The computer stylus defined in claim 7, wherein the antenna resonating element arm extends between the sensor leg and the additional sensor leg and comprises a bend.

9. The computer stylus defined in claim 6, wherein the sensor electrode is shorted to the antenna resonating element arm through a segment of the conductive traces, the antenna resonating element comprising the segment of the conductive traces and a portion of the sensor electrode.

10. The computer stylus defined in claim 6 further comprising a flexible printed circuit on the substrate, wherein the sensor electrode is formed on the flexible printed circuit, a portion of the sensor electrode overlaps the antenna resonating element arm, and the flexible printed circuit has an end that is interposed between the portion of the sensor electrode and the antenna resonating element arm.

11. The computer stylus defined in claim 10, wherein the antenna resonating element arm is capacitively coupled to the portion of the sensor electrode and the antenna resonating element comprises the portion of the sensor electrode.

12. The computer stylus defined in claim 6, wherein the conductive traces further comprise a grid of driver and receiver lines for the sensor and the sensor electrode comprises a loop-shaped grounded electrode that surrounds the grid of driver and receiver lines.

13. The computer stylus defined in claim 12, wherein the loop-shaped grounded electrode comprises a first terminal coupled to the antenna resonating element arm and a second terminal coupled to the metal tube through the filter.

14. The computer stylus defined in claim 1, wherein the sensor comprises a sensor selected from the group consisting of: a proximity sensor, a touch sensor, and a force sensor.

15. A computer stylus comprising:
an elongated body having a tip and an opposing end coupled by a shaft, wherein the shaft extends along a longitudinal axis, has a circumference, and includes a metal tube;
a dielectric support structure at the end of the elongated body;
a sensor that includes a conductive structure on the dielectric support structure, a sensor leg extending from the conductive structure, and a filter coupled between the sensor leg and the metal tube; and
an antenna having an antenna resonating element arm on the dielectric support structure that wraps around at least part of the circumference.

16. The computer stylus defined in claim 15, wherein the filter comprises a choke inductor coupled between the sensor leg and the metal tube.

17. The computer stylus defined in claim 15, wherein the antenna resonating element arm is shorted to the conductive structure.

18. The computer stylus defined in claim 15, wherein the sensor comprises an additional sensor leg extending from the conductive structure and an additional filter coupled between the additional sensor leg and the metal tube.

19. The computer stylus defined in claim 15, further comprising:
a flexible printed circuit on the dielectric support structure, wherein the sensor leg and the conductive structure are formed on the flexible printed circuit, a portion of the conductive structure overlaps the antenna resonating element arm, and a portion of the flexible printed circuit is interposed between the portion of the conductive structure and the antenna resonating element arm.

20. A computer stylus, comprising:
an elongated body having a tip and an opposing end coupled by a shaft that extends along a longitudinal axis and that has a circumference, wherein the shaft includes a metal tube and a dielectric outer tube that covers the metal tube;
control circuitry in the shaft;
a sensor at the end of the elongated body and coupled to the control circuitry over a sensor data path, wherein the sensor comprises a conductive electrode configured to generate a sensor signal, the sensor data path is configured to convey the sensor signal to the control circuitry, and the sensor data path comprises a conductive line that is coupled to the metal tube through a filter; and
an antenna having an antenna resonating element arm that is coupled to the metal tube and that is interposed between the metal tube and the conductive electrode, wherein the antenna is configured to convey radio-frequency signals within a frequency band and the filter is configured to isolate the conductive electrode from the metal tube in the frequency band.

* * * * *